(12) United States Patent
Georges et al.

(10) Patent No.: US 6,373,864 B1
(45) Date of Patent: Apr. 16, 2002

(54) SUB-NANOSECOND PASSIVELY Q-SWITCHED MICROCHIP LASER SYSTEM

(75) Inventors: Patrick Georges, Palaiseau; Francois Balembois, Boissy le Sec; Frederic Druon, Aubervilliers; Alain Brun, Gometz la Ville; Pierre Jean Devilder, Grenoble, all of (FR)

(73) Assignee: Nanolase S.A., Meylan (FR)

( * ) Notice: Subject to any disclaimer, the term of this patent is extended or adjusted under 35 U.S.C. 154(b) by 0 days.

(21) Appl. No.: 09/488,978

(22) Filed: Jan. 21, 2000

(51) Int. Cl.⁷ .............................. H01S 3/11; H01S 3/113; H01S 3/14; H01S 3/091; H01S 3/08

(52) U.S. Cl. .............................. 372/10; 372/11; 372/68; 372/71; 372/98

(58) Field of Search ............................. 372/10, 68, 71, 372/98, 109, 11

(56) References Cited

U.S. PATENT DOCUMENTS 6,009,110 A  * 12/1999  Wiechmann et al. ......... 372/10

OTHER PUBLICATIONS

Druon et al, compact high repetition rate 300ps pulsed uv source using passively q–switch microchip laser and efficient multipass amplifier, May 25, 1999, cleo '99.*

Zayhowski, ultraviolet generation with passively q–switched microchip lasers, optics letters, vol. 21, No. 8, Apr. 15, 1996.*

A diode–pumped, high gain, planar waveguide, Nd:Y3AI5O12 amplifier, D.P. Shepherd, C.T.A. Brown, T. J. Warburton, D.C. Hanna, and A.C. Tropper, Optoelectronics Research Centre, University of Southampton, Highfield, Southampton SO!& IBJ. United Kingdom.

"Multipass Diode–Pumped Nd:YAG Optical Amplifiers At 1.06 um And 1.32 um", Todd E. Olson, Thomas J. Kane, Member, IEEE, William M. Grossman, and Henry Plaessmann; IEEE Photonics Technology Letters, vol. 6, No. 5, May 1994.

"Efficient Wavelength Conversion with High–Power Passively Q–Switched Diode–Pumped Neodymium Lasers", Antonio Agnesi, Stefano Dell'Acqua, Enrico Piccinini, Giancarlo Reali, and Giuliano Piccinno; IEEE Journal of Quantum Electronics, vol. 34, No. 8, Aug. 1998.

"Performance of Diode–Pumped Nd:YAG and Nd–YLF Lasers in a Tightly Folded Resonator Configuration", Thomas M. Baer, David F. Head, Phillip Gooding, Gregory J. Kintz, and Sheldon Hutchison, IEEE Journal of Quantum Electronics, vol. 28, No. 4, Apr. 1992.

"Diode–pumped passively Q–switched picosecond microchip lasers", J.J. Zayhowski and C. Dill III, Optics Letters, Sep. 15, 1994, vol. 19, No. 18, Lincoln Laboratory, Massachusetts Institute of technology, 244 Wood Street, Lexington, Massachusetts 02173–9108.

(List continued on next page.)

Primary Examiner—Frank G. Font
Assistant Examiner—Armando Rodriguez
(74) Attorney, Agent, or Firm—Oppedahl & Larson LLP

(57) ABSTRACT

A sub-nanosecond passively Q-switched microchip laser is disclosed. It combines an optically pumped, passively Q-switched, high-frequency, microchip laser producing short pulses with an optically end-pumped amplifier producing high small-signal gain while pumped at low power. The microchip laser for emitting pulsed laser radiation is a monolithic body comprising two reflective elements defining an optical resonator for laser radiation, a laser gain medium, e.g., Nd:YAG, and a saturable absorber medium, e.g., $Cr^{4+}$:YAG placed inside said resonator. The optical amplifier stage for amplifying the laser radiation comprises an amplifying medium, e.g., Nd:YVO$_4$. The microchip laser and the amplifier are optically end-pumped, preferably by high-brightness diodes. This entirely passive laser system directly produces $\mu$J pulses at repetition rates of about 45 kHz.

28 Claims, 4 Drawing Sheets

OTHER PUBLICATIONS

"Passively Q–switched Monolithic Microchip Laser", I. Fulbert, J. Marty, B. Ferrand, E. Molva, Laboratory of Electronics Technology and Instrumentation.

"Compact high–repetition–rate 300–ps pulsed UV source using passively Q–switch microchip laser and efficient multipass amplifier", F. Druon, F. Balembois, P. Georges and A. Brun. Laboratories Charles Fabry de l'Institut d'Optique.

"56–ps passively Q–switched diode–pumpled microchip laser", B. Braun, F.X. Kartner, G. Zhang, M. Moser, and U. Keller. Optics Letters, Mar. 15, 1997, vol. 22, No. 6., 1997 Optical Society of America.

"High–Power Nd–Doped Fiber Amplifier for Coherent Intersatellite Links", Etienne Rochat, Karim Haroud, and Rene Dandliker. IEEE Journal of Quantum Electronics, vol. 35, No. 10, Oct. 1999.

"High Repetition Rate Solid–State Laser for Space Communications", C. Larat, M. Schwarz, J.P. Pochelle, G. Feugnet and M. Papuchon, Thompson–CSF, Laboratoire Central de Recherches, Domain de Corbeville, 91404 Orsay Cedex, France. SPIE vol. 2381.

"Optimal Design of Passively Q–Switched Microlaser Transmitters for Satellite Laser Ranging." John J. Degnan, NASA Goddard Space Flight Center, Greenbelt, MD 20771 USA.; EUDI Sep. 3, 1998.

\* cited by examiner

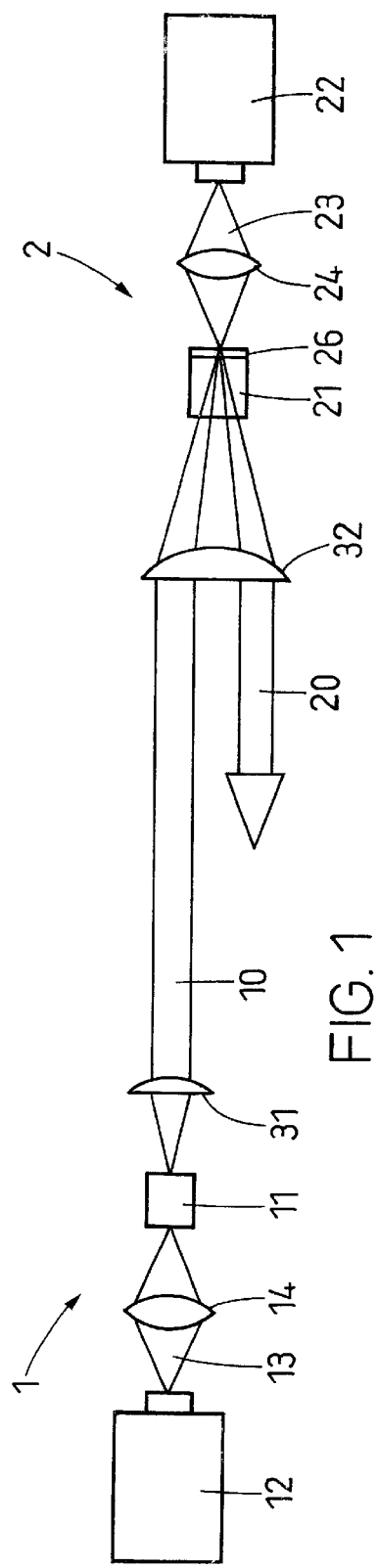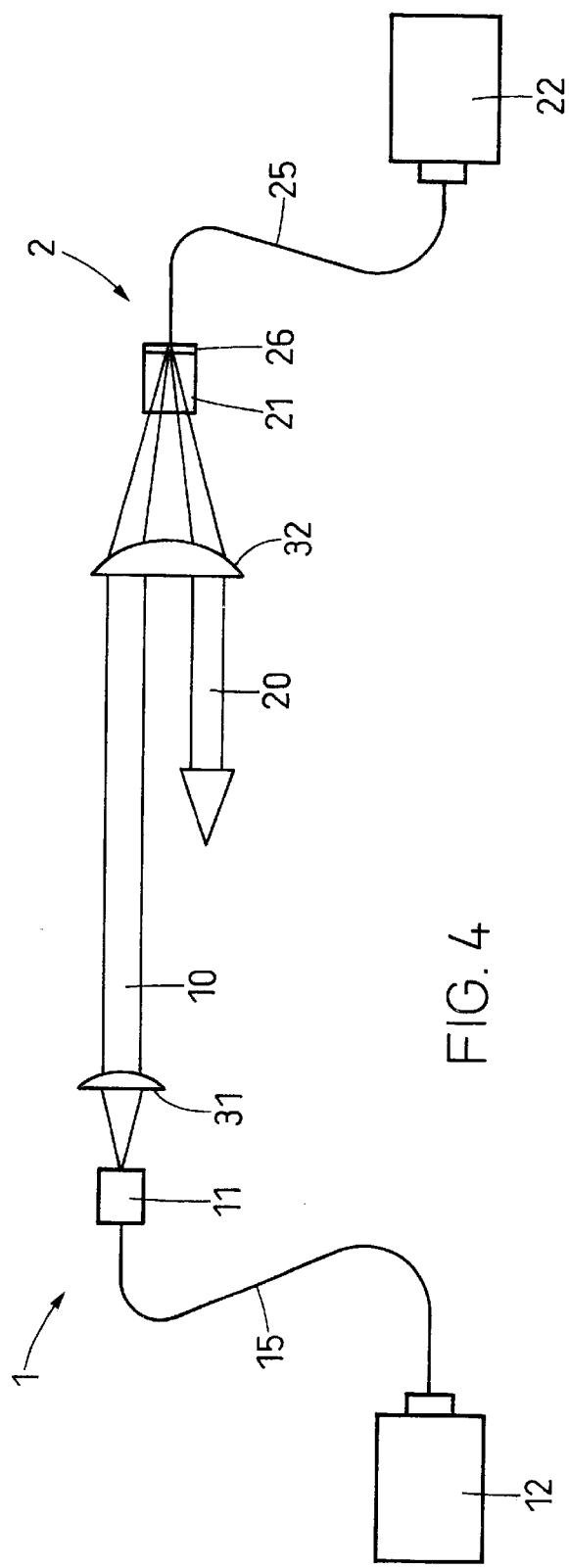

SUB-NANOSECOND PASSIVELY Q-SWITCHED MICROCHIP LASER SYSTEM

FIELD OF THE INVENTION

This invention relates to pulsed lasers, to laser amplifiers and to methods for generating and amplifying pulsed laser radiation and, more particularly, to an entirely passive laser system both for the generation and the amplification of short pulses.

BACKGROUND OF THE INVENTION

Production of short pulses with high energy per pulse is usually achieved by a combination of one oscillator and one amplifier. The oscillator is traditionally a mode-locked laser producing very short pulses of typically less than 100 ps at high frequency of typically a few tens of MHz and with a low energy per pulse of a few nJ. To increase the pulse energy to several $\mu$J, one uses an amplifier working at a lower repetition rate from a few kHz to a few hundreds of kHz, depending on the pumping configuration. These systems are complex and complicated to use because they require active modulation (acousto-optic or electro-optic modulators) with high-speed electronics for short-pulse production for the oscillator plus injection and synchronization of the pulses inside the amplifier.

Passively Q-switched lasers using Nd-doped crystals can produce high-peak-power pulses of several kW at a wavelength of 1064 nm. Depending on the experimental setup, the pulse width can vary from few tens of ns (A. Agnesi, S. Dell'Acqua, E. Piccinini, G. Reali and G. Piccinno, "Efficient wavelength conversion with high power passively Q-switched diode-pumped neodymium laser", IEEE, J. Q. E., Vol. 34, 1480–1484, 1998) to few hundreds of ps (J. J. Zayhowski, "Diode-pumped passively Q-switched picosecond microchip lasers", Opt. Lett., Vol. 19, 1427–1429, 1994). For instance pulses of 19 ns and 108 $\mu$J can be obtained at 25 kHz and 1064 nm from a diode-pumped Nd:YAG laser with a $Cr_{4+}$:YAG saturable absorber crystal. The high peak power of these lasers allows efficient wavelength conversion into the ultra-violet (UV) range with optically nonlinear materials (A. Agnesi, S. Dell'Acqua, E. Piccinini, G. Reali and G. Piccinno, "Efficient wavelength conversion with high power passively Q-switched diode-pumped neodymium laser", IEEE, J. Q. E., Vol. 34, 1480–1484, 1998; J. J. Zayhowski, "Diode-pumped passively Q-switched picosecond microchip lasers", Opt. Lett., Vol. 19, 1427–1429, 1994; J. J. Zaykowski, "UV generation with passively Q-switched microchip laser", Opt. Lett., Vol. 21, 588–590, 1996).

To reduce the pulse width with the same material combination, one must combine the active medium and the saturable absorber in a short distance to reduce the cavity length to about 1 mm typically. A microchip laser combines the two materials in a monolithic crystal (J. J. Zaykowski, "Non linear frequency conversion with passively Q-switched microchip lasers", CLEO 96, paper CWA6, 23 6–237, 1996); the energy is then smaller, e.g., 8 $\mu$J at 1064 nm. The two materials, i.e., the laser material and the saturable absorber, can be contacted by a thermal bonding, or the saturable absorber can be grown by liquid phase epitaxy (LPE) directly on the laser material (B. Ferrand, B. Chambaz, M. Couchaud, "Liquid Phase Epitaxy: a versatile technique for the development of miniature optical components in single crystal dielectric media", Optical Materials 11, 101, 1998). At the same time, in order to obtain sub-nanosecond pulses, the saturable absorber must be highly doped and therefore the repetition rate is lower (e.g., 6–8 kHz with Nd:YAG). The wavelengthconversion efficiency from infrared (IR) to UV is in the order of 4 %. A solution to simultaneously obtain short pulses and a high repetition rate is to combine a $Nd:YVO_4$ crystal, whose short fluorescence lifetime of Nd:YVO4 is well suited for a higher repetition rate, with a semiconductor-based saturable absorber in an anti-resonant Fabry-Perot structure (B. Braun, F. X. Kdarner, G. Zhang, M. Moser, U. Keller, "56 PS passively Q-switched diode-pumped microchip laser", Opt. Lett., 22, 381–383, 1997). This structure is nevertheless complex to produce.

It is therefore difficult to simultaneously produce sub-nanosecond short pulses, at frequencies of a few tens of kHz, with several micro-Joule per pulse in a simple and compact system. The solution consists in combining a compact oscillator producing short pulses at high frequency with an amplifier to increase the pulse energy. Amplifiers have been used in the past with pulsed microlasers. After amplification, pulses with 87 nJ (small-signal gain of 3.5) at 100 kHz have been produced using a 10-W diode bar as a pump (C. Larat, M. Schwarz, J. P. Pocholle, G. Feugnet, M. Papuchon, "High repetition rate solid-state laser for space communication", SPIE, Vol. 2381, 256–263). A small-signal gain of 16 has been obtained with an 88-pass complex structure using two 20-W diode bars as a pump (J. J. Degnan, "Optimal design of passively Q-switched microlaser transmitters for satellite laser ranging", Tenth International Workshop on Laser Ranging Instrumentation, Shanghai, China, Nov. 11–15, 1996). In these two examples, the amplification efficiency that can be defined as the ratio between the small-signal gain and the pump power is small because the transverse pumping has a low efficiency due to the poor overlap of the gain areas with the injected beam. Furthermore, these setups use Nd:YAG crystals not suited for high-frequency pulses (the fluorescence lifetime is 230 $\mu$s).

A combination of Nd ions in two different hosts, in a oscillator-amplifier system, has been performed in the past in continuous wave (cw) (H. Plaesmann, S. A. Ré, J. J. Alonis, D. L. Vecht, W. M. Grossmann, "Multipass diode-pumped solid-state optical amplifier", Opt. Lett., 18, 1420–1422, 1993) or pulsed mode (C. Larat, M. Schwarz, J. P. Pocholle; G. Feugnet, M. Papuchon, "High repetition rate solid-state laser for space communication", SPIE, Vol. 2381, 256–263). In these cases, the spectral distance between the emission lines of the two different material Nd:YAG and $Nd:YVO_4$ limits the small-signal gain to a value tower than the obtained when only $Nd:YVO_4$ is used in both the oscillator and the amplifier; it lies between from 5.5 $cm^{-1}$ and 7.0 $cm^{-1}$ (J. F. Bernard, E. Mc Cullough, A. J. Alcock, "High gain, diode-pumped $Nd:YVO_4$ slab amplifier", Opt. Commun., Vol. 109, 109–114, 1994).

A number of amplification schemes using Nd ions in crystals have been studied, but often end up with complex multipass setups and with low efficiency due to transverse pumping.

End-pumped single-pass or double-pass amplification schemes based on guiding structures to increase the interaction length between the pump beam and the injected beam have been studied in the past: in planar guides (D. P. Shepherd, C. T. A. Brown, T. J. Warburton, D. C. Hanna and A. C. Tropper, "A diode-pumped, high gain, planar waveguide $Nd:Y_3Al_5O_{12}$ amplifier", Appl. Phys. Left., 71, 876–878, 1997) or in double-cladding fibers (E. Rockat, K. Haroud, R. Dandliker, "High power Nd-doped fiber amplifier for coherent intersatellite links", IEEE, JQE, 35, 1419–1423, 1999; I. Zawischa, K. Plaman, C. Fallnich, H.

Welling, H. Zellner, A. Tunnermann, "All solid-state neodymium band single frequency master oscillator fiber power amplifier system emitting 5.5 W of radiation at 1064 nm", Opt. Lett., 24, p. 469–471, 1999). These schemes are, however, not suited for high-peak-power pulses because unwanted nonlinear effects, such as the Raman effect, start to appear around 1 kW of peak power.

A high small-signal gain of 240 was achieved in an end-pumped double-pass bulk Nd:YLF amplifier, but it was used with a cw laser with an expensive diode-beam shaping optical setup (G. J. Friel, W. A. Clarkson, D. C. Hanna, "High gain Nd:YLF amplifier end-pumped by a beam shaped bread-stripe diode laser", CLEO 96, paper CTUL 28, p. 144, 1996).

SUMMARY OF THE INVENTION

The object of this invention is to provide an entirely passive laser system both for the generation and amplification of short pulses. The oscillator shall directly produce $\mu J$ pulses at the required repetition rate and shall be amplified in a few passes only in a non-synchronized amplifier.

The uniqueness of our approach is to combine an optically pumped, passively Q-switched, high frequency, Nd:YAG microchip laser producing short pulses with an optically end-pumped Nd:YVO$_4$ amplifier producing high small-signal gain while pumped at low power. The use of the two materials in our system allows nevertheless to best use of their respective properties:

Nd:YAG/Cr$^{4+}$:YAG microchip lasers are simpler and easier to manufacture than Nd:YVO$_4$ microchips because they use the same crystal (YAG) for the laser medium and the saturable absorber and can be produced in a collective fashion. In addition they produce shorter pulses except in the case of the semiconductor saturable absorber described in B. Bräun, F. X. Kartner, G. Zhang, M. Moser, U. Keller, "56 ps passively Q-switched diode-pumped microchip laser", Opt. Lett., 22, 381–383, 1997.

Nd:YVO$_4$ is on the other hand well suited for amplification due to its high stimulated emission cross section. It is also better suited than Nd:YAG for higher repetition rate due to a shorter fluorescence lifetime (100 $\mu s$ instead of 230 $\mu s$).

The laser system for emitting pulsed electromagnetic laser radiation according to the invention comprises:

a microchip laser for emitting pulsed laser radiation, said microchip laser comprising
two reflective elements defining an optical resonator for laser radiation, a laser gain medium placed inside said resonator and a saturable absorber medium placed inside said resonator for passively Q-switching said laser radiation, said reflective elements, said gain medium and said saturable absorber medium being rigidly and irreversibly bonded such as to form a monolithic body, and
a first pumping source for emitting first pumping radiation which impinges on said monolithic body and excites said gain medium to emit laser radiation; and
an optical amplifier stage for amplifying electromagnetic radiation, said amplifier stage comprising
an amplifying medium and
a second pumping source for emitting second pumping radiation which impinges on said amplifying medium and excites it to amplify electromagnetic radiation;
said microchip laser and said optical amplifier being mutually arranged such that pulsed laser radiation emitted by said microchip laser is amplified by said optical amplifier.

The method for generating pulsed electromagnetic radiation according to the invention comprises the steps of:

generating first pumping radiation;
impinging said first pumping radiation on a monolithic body comprising two reflective elements defining an optical resonator, a laser gain medium placed inside said resonator and a saturable absorber medium placed inside said resonator;
exciting said laser gain medium to generate laser radiation, by impinging said first pumping radiation on said laser gain medium;
recirculating said laser radiation in an optical resonator;
passively Q-switching said laser radiation by passing it through said saturable absorber medium;
partially outcoupling said pulsed laser radiation out of said optical resonator;
generating second pumping radiation;
exciting an amplifying medium to amplify electromagnetic radiation, by impinging said second pumping radiation on said amplifying medium; and
amplifying said outcoupled pulsed laser radiation by passing it through said amplifying medium.

BRIEF DESCRIPTION OF THE DRAWINGS

FIG. 1 is a schematic illustration of a first embodiment of the laser system according to the invention;

FIG. 4 is a schematic illustration of an embodiment of the laser system according to the invention pumped by fiber-coupled diodes;

DESCRIPTION OF THE PREFERRED EMBODIMENTS

A first embodiment of the laser system according to the invention is schematically shown in FIG. 1. The laser system comprises two main subsystems:

a microchip laser 1 (cf. J. J. Zayhowski, "Diode-pumped passively Q-switched picosecond microchip lasers", Opt. Lett. 19, 1427–1429, 1994; L. Fulbert, J. Marty, B. Ferrand, E. Molva, "Passively Q-Switched monolithic microchip laser", Proc. of Conference on Laser and Electro Optics 1995, Optical Society of America, paper CWC5, Washington D.C., 1995) optimized for a high repetition rate; and an amplifier stage 2 (cf. F. Druon, F. Balembois, P. Georges and A. Brun, "High repetition rate 300 ps pulses ultraviolet source passively Q:switched microchip laser and a multipass amplifier", Opt. Lett. 24, 499–501, 1999).

Figure 2:
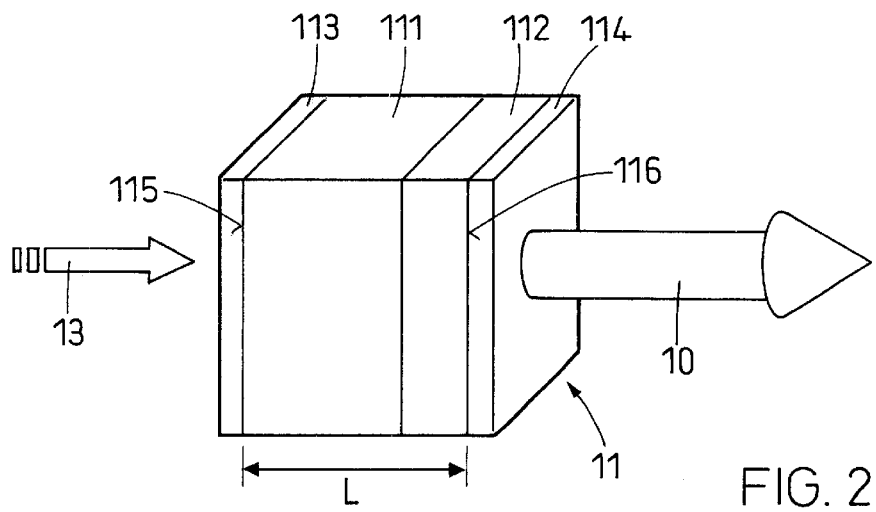
FIG. 2 is a schematic illustration of a microchip laser cavity used in a preferred embodiment of the laser system according to the invention.

The microchip laser 1 is described in greater detail with reference to FIG. 2. It essentially comprises a laser gain medium 111, e.g., Nd:YAG, a saturable absorber medium 112, e.g., $Cr^{4+}$:YAG, and two reflective elements 113, 114 which define an optical resonator (the laser cavity) of length L, e.g., L=1.5 mm or less. The laser gain medium 111 and the saturable absorber medium 112 are either bonded together by diffusion bonding, or the saturable absorber is deposited on the laser medium by liquid phase epitaxy; the two media 111, 112 thus form one single solid body with a first and a second end face 115, 116. The reflective elements 113, 114 are preferably multiple stacks of dielectric and/or semiconductor layers as known in the art, grown on the end faces 115, 116 of the solid body and optimized to have a desired reflectivity at a given wavelength. Preferably, the first end face 115 is coated with a highly reflective mirror and the second end face 116 is coated with a mirror reflectivity between 75% and 95% at the laser wavelength of 1064 nm. All elements 111–114 form together a small, monolithic body or "microchip" 11.

The microchip laser 1 is optically pumped by first pumping radiation 13 emitted by a first pumping source 12 which is preferably a high-brightness diode, i.e., a diode with maximum power within a solid angle which is as small as possible. The first pumping radiation 13 (with a pumping wavelength, of, e.g., 808 nm) for optically exciting the gain medium 111 is focused by coupling optics 14 on the gain medium 111 and enters into the microchip 11 via the first end face 115. Generated laser light 10 (with a laser wavelength of, e.g., 1064 nm) is coupled out of the microchip 11 via the second end face 116.

In order to produce short pulses at high repetition rates, the cavity length is preferably reduced to L≦1.5 mm, producing a single-frequency, Gaussian-mode output beam 10. The repetition rate is further increased by optimizing further parameters such as the concentration of the saturable absorber in the saturable-absorber medium 112, the pumping-power density and/or the brightness of the first pumping source 12.

Figure 3:
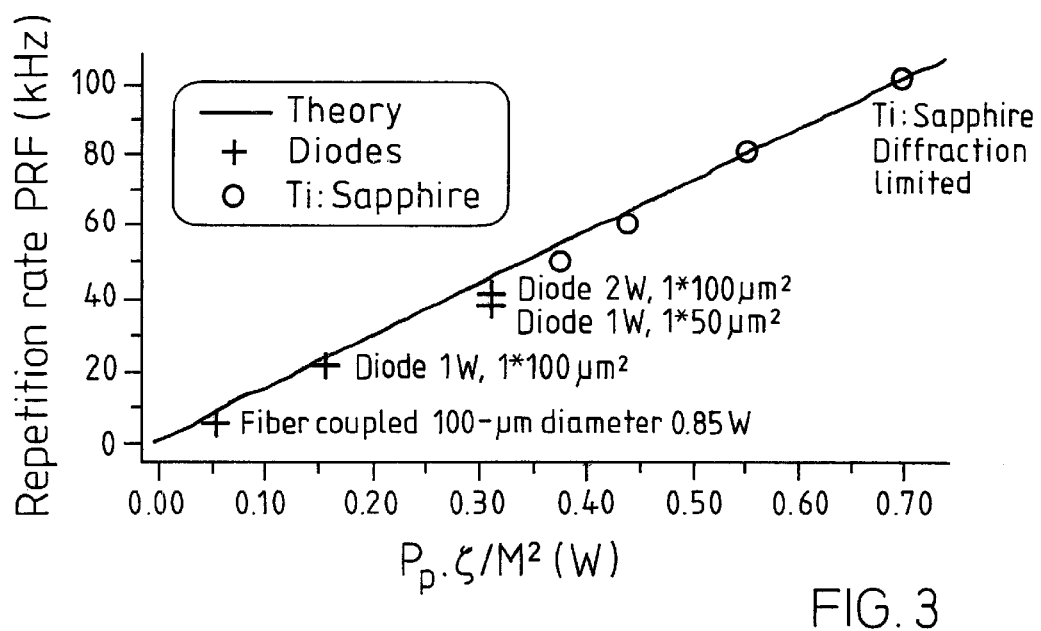
FIG. 3 is a graphical representation of the pulse repetition rate versus the pump brightness.

The first pumping diode 12 and the coupling optics 14 must be carefully selected. The dependency of the pulse repetition rate (or frequency) PRF on the brightness of the first pumping-diode 12 is shown in FIG. 3. The horizontal axis represents the ratio of the pumping power $P_p$ to the $M^2$ figure of merit (cf. T. F. Johnston, Jr., "$M^2$ concept characterizes beam quality", Laser Focus World, May 1990) of the pumping beam 13, multiplied by a coefficient ζ which depends on the pumping-beam geometry (e.g., ζ=1 for a perfect circular beam and ζ=√3 for a beam emitted by a diode junction). The experimental results are plotted and compared to a calculation. Based on these results a high-brightness diode with a "selfoc" (grin lens) coupling arrangement to correct for some aberrations is used as the first pumping-light source 12. In a first embodiment a 2-Watt high-brightness diode 12 with an emitting area of 100 μm×1 μm is used, in a second embodiment a 1-Watt diode 12 with an emitting areaof 50 μm×1 μm is used. Further scaling of the pumping power while maintaining brightness is possible. With a 2-Watt 100 gμm×1 μm diode 12 the microchip laser 1 emits, for instance, about 1 μJ at a repetition rate of 45 kHz. Turning again to FIG. 1, the amplifier stage 2 is described in the following. The amplifier 2 stage essentially comprises an amplifying medium 21 pumped by second pumping radiation 23 emitted by a second pumping source 22. The amplifying medium 21 is preferably a Nd:YVO$_4$ crystal chosen for its large stimulated-emission cross section, its high absorption at 808 nm and its fluorescence lifetime well suited for repetition rates in the order of tens of kHz.

The pumping of the amplifying medium 22 is optimized to insure a good overlap of the second pumping 23 beam and the microchip-laser beam 10. The selected scheme is an end-pump configuration, i.e., the propagation direction of the second pumping light 23 is essentially parallel to the optical axis of the amplifier 2, and thus also essentially parallel to the propagation direction of the laser beam 10. The pumping power has to be sufficiently high to allow enough energy storage in the amplifier 2 but not too high to avoid thermal effects. A thermal lens created by the focusing of the second pumping beam 23 would degrade the performance. Such thermal effects appear beyond a pumping power of about 2 W; this is the power used in the preferred embodiment of the laser system according to the invention.

Figure 5:
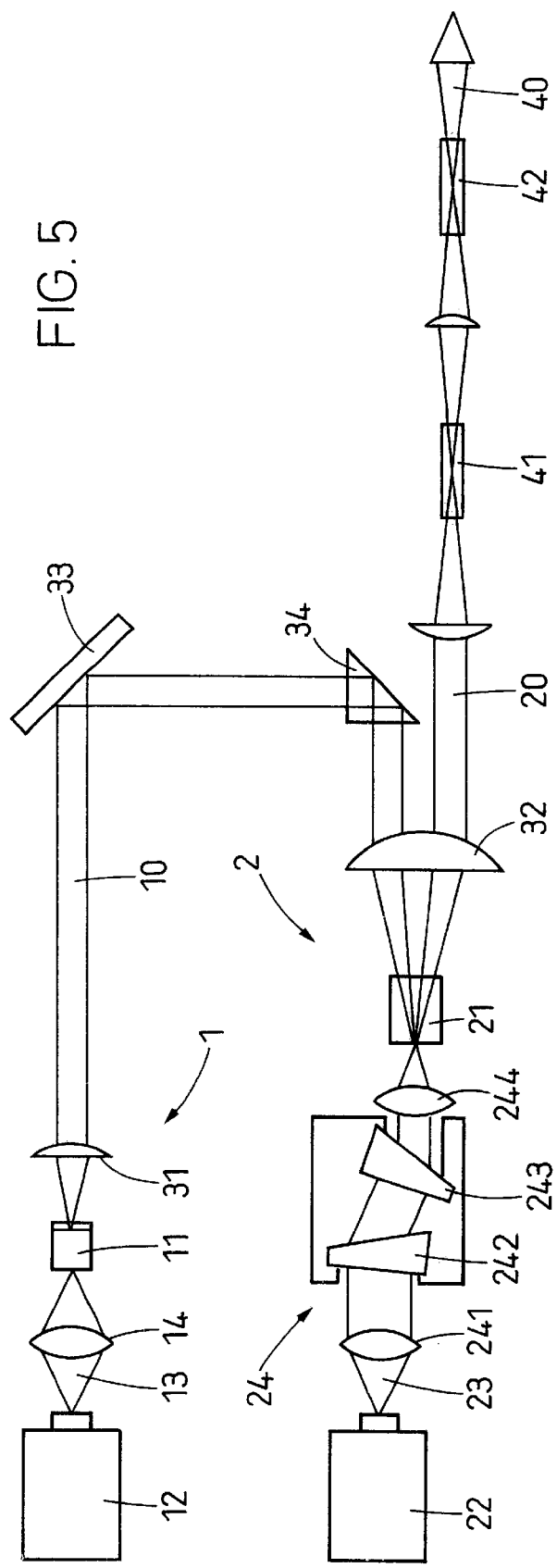
FIG. 5 is a schematic illustration of an embodiment of the laser system according to the invention for generating UV radiation.

The coupling of the second pumping beam 23 into the amplifying medium 21 is very important, because its quality defines the quality of an output beam 20 of the laser system. Best results are obtained using a coupling optical system 24 consisting of a combination of an aspherical lens, anamorphic prisms and an objective, as shown in FIG. 5.

A back face 27 of the amplifier crystal 21 is preferably coated with a reflective coating 26. The microchip-laser beam 10 is reflected from the coating 26 and thus passes twice through the amplifier crystal 21. The performance relies on two optimizations:

Parallelism between the polarization of the microchip-laser beam 10 and the direction in which the stimulated-emission cross section of the amplifier crystal 21 is the largest. To insure this, a half-wave plate is inserted into the microchip beam 10 before it enters the amplifier stage 2 and is used to tune the polarization to the proper direction. Alternatively, the microchip with a given polarization could be rotated to position its polarization parallel to the one from the amplifier.

Parallelism between the polarization of the second pumping beam 23 and the direction of the largest absorption in the amplifier crystal 21.

The output beam 10 of the microchip laser 1 is collimated by a collimating optical system 31, and is focused into the amplifier crystal by a focusing optical system 32. The same focusing optical system 32 can be used to collimate the output beam 20 of the amplifier 2. The focused laser beam 10 enters and leaves the amplifier crystal 21 at a very small angle of incidence (e.g., of about 4°). Of course, other, preferably multi-pass, amplifier types can be used for the laser system according to the invention, e.g., a four-pass amplifier as disclosed in U.S. Pat. No. 5,268,787 (McIntyre).

With the preferred embodiment shown in FIG. 1, an output power of 450 mW at a repetition rate of 45 kHz (10 μJ per pulse) is achieved with a microchip-laser output of 45 mW and 45 kHz. With a higher microchip-laser power of 150 mW, an output power of 800 mW is achieved with the same excellent spatial and spectral beam quality, i.e., a Gaussian and single-longitudinal-mode beam 20.

In another embodiment, replacing the Nd:YVO$_4$ amplifier crystal by a Nd:YAG crystal 21 allows to pump the amplifier stage 2 harder, beyond 2 W, and increase the output power of the laser system according to the invention both in average power and energy per pulse at a lower repetition rate.

In a further embodiment, a different set of materials is used to generate an output beam in the so-called eye-safe spectral range of 1.54 μm (Ph. Thony, B. Ferrand, E. Molva, "1.55 μm passive Q-Switched microchip laser", Advanced Solid State Laser, AWC3-1, 327, 1998). This is achieved by using a passively Q-switched microchip laser 1 with a combination of an Er:glass or Yb:glass laser gain medium 111 with an LMA:Co$^{2+}$ (LaMgAl$_{11}$O$_{19}$:Co$^{2+}$) saturable absorber 112 (Er:Glass/LMA:Co$^{2+}$, Yb:Glass/LMA:Co$^{2+}$) and an Er:glass or Yb:glass amplifier crystal 21, both pumped by high-brightness diodes 12, 22 emitting at 980 nm.

In a still further embodiment, a different set of materials is used to produce an output beam at 1030 nm. This is achieved by using a passively Q-switched microchip laser 1 with a combination of an Yb:YAG laser gain medium 111 with a Cr$^{4+}$:YAG saturable absorber 112 (Yb:YAG/Cr$^{4+}$:YAG) and an Yb:YAG amplifier crystal 21, both pumped by high-brightness diodes 12, 22 emitting in the range of 940–980 nm. Other possible laser-gain materials are Nd:YVO$_4$ or Nd:YLF.

FIG. 4 shows an embodiment of the laser system according to the invention where the first pumping diode 12 and the second pumping diode 22 are coupled by optical fibers 15, 25 to the monolithic body 11 and the amplifier crystal 21, respectively. This embodiment has three advantages. Firstly, it removes the diode heat source from the laser head and puts it in a remote location, e.g., inside a power supply (not shown). Secondly, it reduces the size of the laser-head package, since no active element is located in the laser head. Thirdly, the beam emitted by a fibered diode is circular; it is easier and more simple to image the tip of the fiber into the laser medium than a diode junction. However, this embodiment has the disadvantage of being more expensive and potentially less stable.

With the high peak power and high repetition rate available at 1064 nm, wavelength conversion can be readily achieved in a very compact laser system according to the invention. Frequency doubling at 532 nm, tripling at 355 nm, quadrupling at 266 nm, and fifth harmonic at 213 nm can be performed. FIG. 5 shows an example in which in a laser beam 10 generated by a Nd:YAG microchip laser 1 is amplified by a Nd:YVO$_4$ crystal 21. Thereafter, the second and third harmonic are generated by a set of optically nonlinear crystals 41, 42 (such as for instance KTP, BBO or LBO) in a single-pass configuration. In this example, the output beam 40 of the system lies in the UV spectral range.

In order to make the laser system more compact, the microchip-laser output beam 10 is folded by a high-reflectivity laser mirror 33 and a reflective prism 34 at 45° each. The coupling optics 24 for the second pumping beam 23 is more complex in this example than in FIGS. 1 and 4. The coupling optical system 24 consists of a combination of an aspherical lens 241, anamorphic prisms 242, 243 and an objective 244. In a preferred embodiment these components are an aspherical lens 241 with a focal length of f=8 mm, two anamorphic prisms 242, 243 with a magnification by a factor 4 and an objective 244 with a focal length of f=8 mm. In the same embodiment a half-wave plate (not shown) can be insertedbetween two optical components, e.g., between the aspherical lens and the anamorphic prisms, to reduce losses due to reflection on the anamorphic-prism faces.

Figure 6:
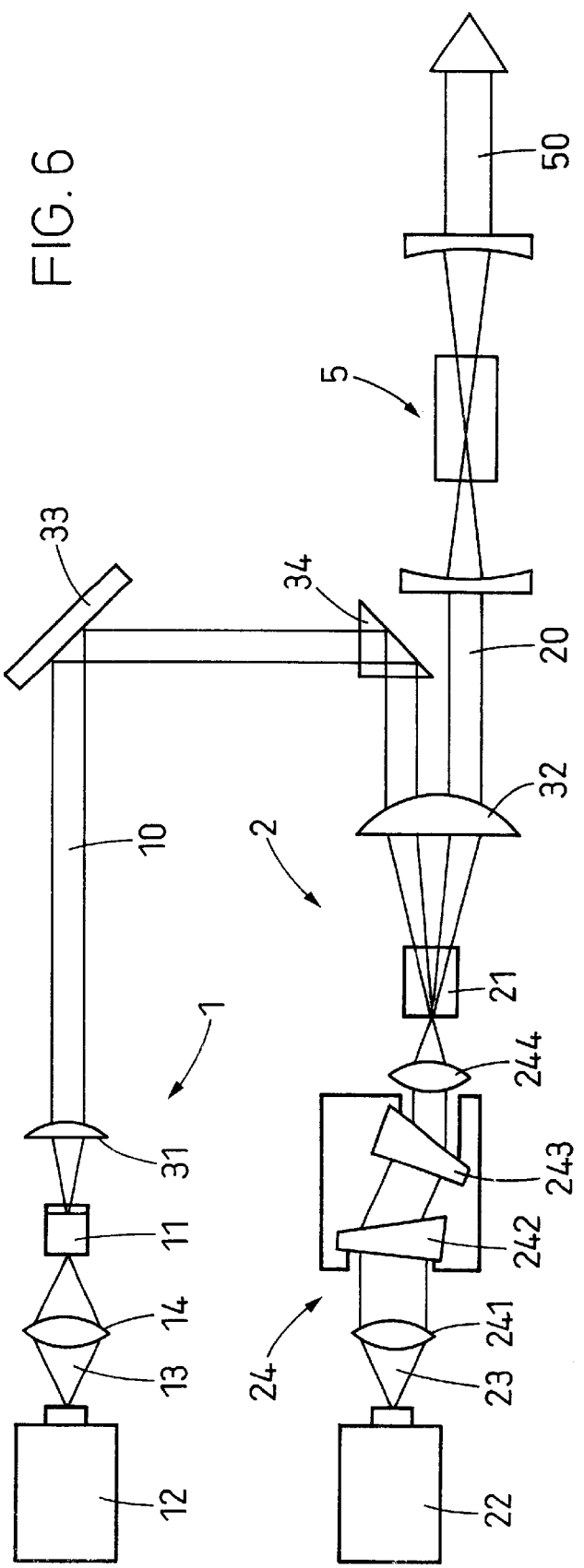
FIG. 6 is a schematic illustration of an embodiment of the laser system according to the invention with a wavelength-tunable output.

In a further embodiment, by appropriately selecting different coatings for the mirrors 113, 114, 26 on both the microchip 11 and the amplifier crystal 21, the 946-nm line of the Nd:YAG laser gain material 111 is favored. The output wavelength of the laser system is then changed from 1064 nm to 946 nm, which is a suitable wavelength to generate high power of blue light at 473 nm by frequency doubling. Frequency tripling and quadrupling techniques allow then to generate additional wavelengths at 315 nm and 236 nm It is also possible to provide the laser system according to the invention with an optical parametric oscillator (OPO) cavity 5 (cf. J. E. Bjorkholm, "Efficient optical parametric oscillation using doubly and singly resonant cavities", Appl. Phys. Lett., Vol. 13, No. 2, 1968), as shown in FIG. 6. This embodiment has a tunable output, and finally a continuum of light can be generated by focusing the output beam 50 of the laser system into a fiber (not shown).

Numerous other embodiments may be envisaged, without departing from the spirit and scope of the invention.

What is claimed is:

1. A laser system for emitting pulsed electromagnetic laser radiation, said laser system comprising:
    a microchip laser for emitting pulsed laser radiation, said microchip laser comprising
        two reflective elements defining an optical resonator for laser radiation, a laser gain medium placed inside said resonator and a saturable absorber medium placed inside said resonator for passively Q-switching said laser radiation, said reflective elements, said gain medium and said saturable absorber medium being rigidly and irreversibly bonded such as to form a monolithic body, and
        a first pumping source for emitting first pumping radiation which impinges on said monolithic body and excites said gain medium to emit laser radiation; and
    an optical amplifier stage for amplifying electromagnetic radiation, said amplifier stage comprising
        an amplifying medium and
        a second pumping source for emitting second pumping radiation which impinges on said amplifying medium and excites it to amplify electromagnetic radiation;
    said microchip laser and said optical amplifier being mutually arranged& such that pulsed laser radiation emitted by said microchip laser is amplified by said optical ampifier.

2. The laser system according to claim 1 wherein said first pumping source and said monolithic body are mutually arranged such that the propagation direction of said first pumping radiation impinging on said monolithic body is essentially parallel to the propagation direction of said laser radiation in said resonator.

3. The laser system according to claim 1 wherein said first pumping source comprises a high-brightness diode.

4. The laser system according to claim 1 wherein said laser gain medium is selected from the group consisting of Nd:YAG, Yb:YAG, Nd:YVO$_4$, Nd:YLF, Er:glass and Yb:glass.

5. The laser system according to claim 1 wherein said saturable absorber medium is Cr4$^+$:YAG or LMA:Co$^{2+}$.

6. The laser system according to claim 1 wherein said reflective elements are stacks of dielectric and/or semiconductor layers on two end faces of said monolithic body.

7. The laser system according to claim 6 wherein said reflective elements are designed such as to have a higher reflectivity for a first laser wavelength of said laser gain medium than for a second laser wavelength of said laser gain medium.

8. The laser system according to claim 1 wherein the geometric length of said resonator is 1.5 mm or less.

9. The laser system according to claim 1 wherein said amplifier stage is a multipass amplifier.

10. The laser system according to claim 9 wherein said amplifying medium is coated with a stack of dielectric and/or semiconductor layers for reflecting laser radiation propagating in said amplifying medium.

11. The laser system according to claim 1 wherein said second pumping source and said amplifying medium are mutually arranged such that the propagation direction of said second pumping radiation impinging on said amplifying medium is essentially parallel to the propagation direction of said laser radiation in said amplifying medium.

12. The laser system according to claim 1 wherein said second pumping source comprises a high-brightness diode.

13. The laser system according to claim 1 wherein said amplifying medium is selected from the group consisting of Nd:YVO$_4$, Nd:YAG, Yb:YAG, Er:glass and Yb:glass.

14. The laser system according to claim 1, additionally comprising means for optically coupling said microchip laser and said amplifier stage.

15. The laser system according to claim 1, additionally comprising a frequency-conversion stage for converting said pulsed electromagnetic radiation from a first spectral range into a second spectral range.

16. The laser system according to claim 15 wherein said frequency-conversion stage comprises at least one optically nonlinear medium for converting the frequency of said electromagnetic radiation from a first frequency ν to a second frequency nν, where n is an integer equal to or larger than 2.

17. The laser system according to claim 15 wherein said frequency-conversion stage comprises an optical-parametric-oscillator cavity for tuning the frequency range of said electromagnetic radiation.

18. A method for generating pulsed electromagnetic radiation, comprising the steps of:
   generating first pumping radiation;
   impinging said first pumping radiation on a monolithic body comprising two reflective elements defining an optical resonator, a laser gain medium placed inside said resonator and a saturable absorber medium placed inside said resonator;
   exciting said laser gain medium to generate laser radiation, by impinging said first pumping radiation on said laser gain medium;
   recirculating said laser radiation in an optical resonator;
   passively Q-switching said laser radiation by passing it through said saturable absorber medium;
   partially outcoupling said pulsed laser radiation out of said optical resonator;
   generating second pumping radiation;
   exciting an amplifying medium to amplify electromagnetic radiation, by impinging said second pumping radiation on said amplifying medium; and
   amplifying said outcoupled pulsed laser radiation by passing it through said amplifying medium.

19. The method according to claim 18 wherein the propagation direction of said first pumping radiation impinging on said monolithic body is chosen to be essentially parallel to the propagation direction of said laser radiation in said resonator.

20. The method according to claim 18 wherein said first pumping radiation is emitted by at least one high-brightness diode.

21. The method according to claim 18 wherein a first laser wavelength of said laser gain medium is favored in comparison to a second laser wavelength of said laser gain medium.

22. The method according to claim 18 wherein said outcoupled pulsed laser radiation is passed mores than once through said amplifying medium.

23. The method according to claim 18 wherein the propagation direction of said second pumping radiation impinging on said amplifying medium is chosen to be essentially parallel to the propagation direction of said laser radiation in said amplifying medium.

24. The method according to claim 18 wherein said second pumping radiation is emitted by at least one high-brightness diode.

25. The method according to claim 18, additionally comprising the step of converting said pulsed electromagnetic radiation from a first spectral range into a second spectral range.

26. The method according to claim 25 wherein the frequency of said electromagnetic radiation is converted from a first frequency ν to a second frequency nν, where n is an integer equal to or larger than 2.

27. The method according to claim 25 wherein the frequency range of said electromagnetic radiation is tuned in an optical-parametric-oscillator cavity.

28. The laser system according to claim 12, additionally comprising means for coupling said second pumping radiation into said amplifying medium, said coupling means comprising an aspheric lens, anamorphic prisms and an objective lens.

* * * * *